(12) United States Patent
Yegani et al.

(10) Patent No.: US 6,597,920 B2
(45) Date of Patent: Jul. 22, 2003

(54) SYSTEM AND METHOD FOR PRIORITY ACCESS CHANNEL ASSIGNMENT IN A CELLULAR TELEPHONE SYSTEM

(75) Inventors: Parviz Yegani, San Diego, CA (US); Roy Franklin Quick, Jr., San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 86 days.

(21) Appl. No.: 09/946,915

(22) Filed: Sep. 4, 2001

(65) Prior Publication Data

US 2002/0065082 A1 May 30, 2002

Related U.S. Application Data

(63) Continuation of application No. 09/137,770, filed on Aug. 20, 1998.

(51) Int. Cl.$^7$ ................................................ H04B 1/100
(52) U.S. Cl. ...................... 455/512; 455/452; 455/453; 370/329
(58) Field of Search .................... 455/414, 404, 455/435, 455, 572, 450, 451, 452, 453; 370/329, 330

(56) References Cited

U.S. PATENT DOCUMENTS

| 5,226,071 A | * | 7/1993 | Bolliger et al. ............. 455/435 |
| 5,457,735 A | | 10/1995 | Erickson |
| 5,574,977 A | | 11/1996 | Joseph et al. |
| 5,615,249 A | | 3/1997 | Solondz |
| 5,794,156 A | | 8/1998 | Alanara |
| 5,862,485 A | | 1/1999 | Linneweh, Jr. et al. |

FOREIGN PATENT DOCUMENTS

EP 0370826 5/1990

OTHER PUBLICATIONS

"Cellular Features Description" TIA Standard (664) Section 5.17 (Jun. 1996).

* cited by examiner

*Primary Examiner*—Thanh Cong Le
*Assistant Examiner*—Nick Corsaro
(74) *Attorney, Agent, or Firm*—Philip R. Wadsworth; Kent D. Baker; S. Hossain Beladi

(57) ABSTRACT

A priority access channel assignment system and a messaging protocol allow wireless mobile stations to place calls having differing priority levels. A mobile station originates a call, which may automatically include a request for priority access or may require manual intervention by the user to request priority access. If system resources are unavailable to process the call immediately, the origination message is processed by a base station and a mobile switching center using a plurality of messaging protocols to determine the time at which the call was originated and a priority level associated with the call. Based on the priority level and arrival time, the base station places the call in an appropriate position within a queue. Higher priority calls are placed in a higher position in the queue than lower priority calls. Calls having identical priority are placed in the queue in order of the time of arrival.

36 Claims, 9 Drawing Sheets

SYSTEM AND METHOD FOR PRIORITY ACCESS CHANNEL ASSIGNMENT IN A CELLULAR TELEPHONE SYSTEM

CROSS REFERENCE TO RELATED APPLICATION

This application is a continuation of U.S. application Ser. No. 09/137,770, filed Aug. 20, 1998 entitled "SYSTEM AND METHOD FOR PRIORITY ACCESS CHANNEL ASSIGNMENT IN A CELLULAR TELEPHONE SYSTEM", and assigned to the assignee of the present invention.

FIELD OF THE INVENTION

The present invention is related to cellular telephone systems in general and, more particularly, to a system and method for priority access channel assignment in a cellular telephone system.

BACKGROUND OF THE INVENTION

Cellular telephone technology has evolved from relatively simple voice communication with limited geographical areas of coverage to sophisticated communication technology for voice communication, voice messaging, and data messaging virtually anywhere in the world. The number of mobile stations (i.e., users) has grown significantly in recent years. For example, in the United States, a large percentage of the population owns a cellular telephone. In other countries where there is no existing telephone system, cellular telephones are used in place of conventional telephone systems thus eliminating the need for physical wires from central switching offices to individual users.

The implementation of complex communication systems, such as described above, require communication standards and protocols that allow different organizations and manufacturers to maintain compatibility of the overall system. For example, many standards for cellular telephone communication have been established by the Telecommunications Industry Association (TIA) and the Electronic Industries Association (EIA). There are a number of TIA/EIA standards for cellular telephone communication. One such standard is TIA/EIA/IS-95-B, entitled "Mobile Station-Base Station Compatibility Standard for Dual-Mode Wide Band Spread Spectrum Cellular System." This standard, which may be referred to as IS-95-B, defines the communication protocol between mobile station and base station. The utilization of such a standard allows different manufacturers to construct equipment having different design features and implementations, but which will still function satisfactorily if it meets the standards set forth in IS-95-B.

Other features have been defined by TIA/EIA, but have no standards regarding implementation or protocol. For example, priority access channel assignment is a feature that allows a cellular system to prioritize incoming calls from mobile stations into assigned channels to the mobile stations based on these priorities. However, no protocol or standard exists to implement such a feature. Accordingly, it can be appreciated that there is a significant need for a communication protocol and standard that will allow priority access channel assignment. The present invention provides these and other features as will be apparent from the following figures and accompanying detailed description.

SUMMARY OF THE INVENTION

The present invention is embodied in a system and method for communication protocol for priority access channel assignment in a cellular telephone system. The protocol includes a first origination message transmitted from a first of the plurality of mobile stations to a first base station for a first call request from the first mobile station. The first origination message includes data indicative of a priority access channel assignment (PACA) request and a PACA origination element indicating that the first call request is initiated by the first mobile station. A service request message is transmitted from the first base station to a mobile switching center and includes PACA request data based on the PACA origination element transmitted in the first origination message. A PACA command message from the mobile switching center to the first base station indicates PACA authorization and a priority level associated with the first call request. A first PACA message is sent from the first base station to the first mobile station indicating that the first call request has been granted and placed in a queue associated with the first base station. The first PACA message also indicates the position of the first call request within the queue.

Additional protocol elements include a second PACA message to the first mobile station at a subsequent time when resources are available to process the first call request. The second PACA message contains data indicating that the first mobile station should reoriginate the first call request. In response to the second PACA message, the first mobile station transmits a second origination message including the PACA re-origination element set to a value indicating the re-origination of the first call request.

The protocol also includes various optional acknowledgment and confirmation messages that may be transmitted between the mobile station, the base station, and the mobile switching center. The first base station queue may contain a plurality of messages, each having an assigned priority level. The base station processes the pending calls in the queue based on priority with a higher priority pending call request being processed prior to a lower priority pending call request. In addition, the time of arrival of the call request is used to determine the position within the queue. For calls having identical priority levels, the base station processes calls that have the earliest time of arrival prior to processing calls having a later time of arrival.

If the mobile station moves from a first cell to a second cell and is now communicating with a second base station, the mobile switching center transmits a PACA query message to the first base station to request priority information from the first base station. The first base station transmits a PACA query acknowledgment in response to the PACA query message. The PACA query acknowledgment contains the requested priority information. Upon receiving the priority information from the first base station, the mobile switching center transmits a PACA command message to the second base station indicating PACA authorization and a priority level associated with the first call request. The second base station transmits a PACA message to the first mobile station indicating that the call request has been granted and placed in a queue associated with the second base station based on the priority level associated with the first call request.

DETAILED DESCRIPTION OF THE PREFERRED EMBODIMENTS

For the successful completion of a cellular telephone call, the cellular telephone system must have sufficient resources available to process the call request. For example, a call originated by a mobile station requires that a channel be available to assign to that subscriber. During periods of peak communication traffic, a large number of users may utilize all available resources. Under these circumstances, a mobile station may find that the cellular telephone system cannot process a call. The user is forced to try again at a later time when traffic volume has diminished.

However, the present invention allows prioritization of phone calls and assigns channels based on the assigned priorities. For example, emergency calls (e.g., 911, police, fire, and the like) may be automatically assigned a high priority level such that the mobile station calling the emergency number receives a channel assignment prior to a non-emergency mobile station even though the non-emergency mobile station may have been waiting for a longer period of time for a channel assignment. Other subscribers may pay a premium for high priority access to the cellular system. Such a prioritization scheme requires a communication protocol that allows the exchange of data between the mobile station and the cellular telephone service provider. The present invention is directed to a system and method for priority access channel assignment (PACA) in a cellular telephone or other wireless communication system. Although the specific embodiment described herein uses a cellular telephone system as an example, those skilled in the art will recognize that the inventive concepts are applicable to any wireless communication system, including, but not limited to TDMA, PCS, CDMA, and the like. The protocol defined herein is described with respect to a spread spectrum cellular telephone system, such as defined in IS-95-B. However, the invention is not limited to a specific wireless technology or communication standard.

Figure 1:
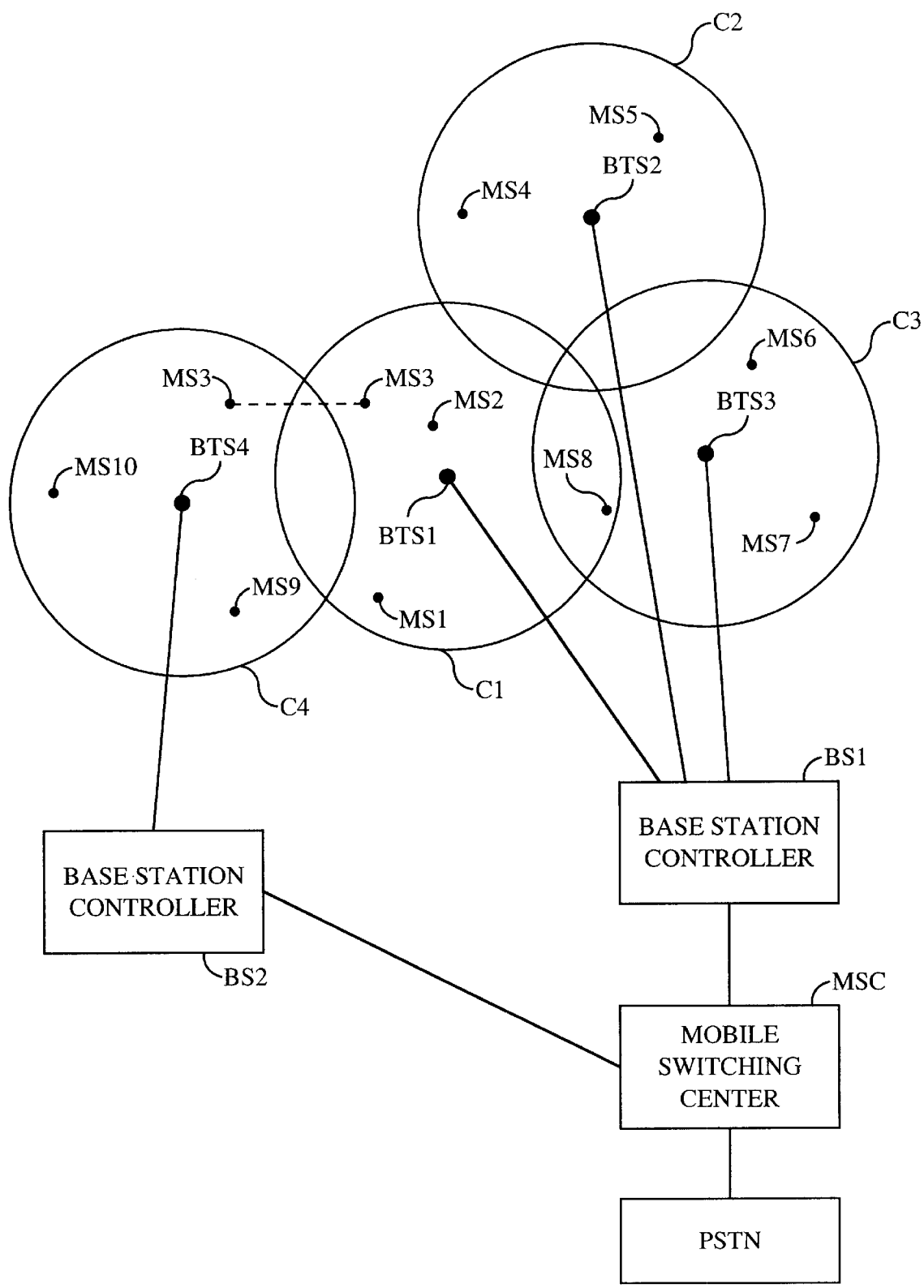
FIG. 1 is a diagrammatic representation of a conventional cellular telephone system.

The PACA communication system and protocol described herein can be implemented within the confines of existing cellular telephone standards (e.g., IS-95-B). Furthermore, the system and protocol of the present invention satisfies the PACA features required by industry standard TIA/EIA-664, entitled *Cellular Features Description*. For a more complete understanding of the PACA system and protocol, a brief description of a conventional cellular telephone system will be provided. FIG. 1 illustrates the elements of a basic cellular telephone system. A geographic area is served by one or more base stations, each of which controls multiple areas of communication coverage known as cells. FIG. 1 illustrates two base station controllers, which may also be referred to simply as base stations BS1 and BS2. Each base station controls one or more cells. A typical base station controls a large number of cells. However, for the sake of clarity, FIG. 1 illustrates only cells C1–C4. Each cell C1–C4 communicates with the base station via a base station transceiver system BTS. FIG. 1 illustrates base station transceiver systems BTS1–BTS4, which relay communications between the base stations and cells C1–C4, respectively. The base station transceiver systems BTS1–BTS3 are illustrated in FIG. 1 as portions of a common serving system, and are all controlled by the base station BS1. The individual base station transceiver systems BTS1–BTS3 are coupled to the base station BS1 by communication links, such as a wireless communication link, hard wired communication link, or the like. In contrast, the base station transceiver system BTS4 is controlled by the base station BS2. The base stations BS1 and BS2 are each coupled to a mobile switching center (MSC). The mobile switching center MSC may connect a call from a mobile station to a conventional telephone system, such as a public switched telephone network (PSTN).

Within each cell are a variable number of mobile stations. For the sake of clarity, FIG. 1 illustrates only a few mobile stations. Mobile stations MS1–MS3 are illustrated in cell C1, mobile stations MS4–MS5 are illustrated in cell C2, mobile stations MS6–MS8 are illustrated in cell C3 and mobile stations MS9–MS10 are illustrated in cell C4. It should be understood that a typical cell will contain many more users than illustrated in FIG. 1.

As those skilled in the art can appreciate, the mobile stations may move from one cell to another during a single communication session. As the mobile station moves from one cell to another (e.g., MS3 moves from cell C1 to cell C4), the old base station performs a handoff of the mobile station to the new base station. In the example illustrated above, the base station BS1 performs a handoff of the mobile station MS3 to the base station BS2. As a result, mobile stations may freely travel in a geographic area while maintaining a communication link that, from the subscriber's perspective, is continuous and seamless. The handoff is referred to as an "idle" handoff if the mobile station is not actively engaged in an ongoing telephone call (e.g., the mobile station is turned on, but is awaiting a call). The handoff is referred to as a "traffic channel" handoff if the mobile station is actively engaged in an ongoing telephone call. The handoff process is well known in the art, and need not be described herein. The PACA communication protocol for idle handoffs will be described in detail below.

In operation, a call originated by a mobile station is coupled to the mobile switching center via the base station controlling the cell in which the mobile station is located. For example, a call originated by the mobile station MS1 is processed by the base station BS1. The base station BS1 communicates with the mobile switching center MSC. The above description assumes that resources are available to assign a channel to mobile station MS1. In a conventional system, if resources are not available at the time mobile station MS1 originates the call, the base station BS1 will refuse the call, and the mobile station MS1 user has no choice but to hang up and try again later.

The PACA system and protocol of the present invention allows a mobile station to obtain priority access to a communications channel by queuing call origination requests when channels are not currently available. The system provides for multiple priority levels and prioritizes calls based on the priority level such that higher priority call requests are queued ahead of lower priority requests. Thus, a higher priority call may be queued ahead of a lower priority call, even though the lower priority call has been in the queue longer. Call requests having the same priority are queued in the order of time of arrival.

The system provides the user with an indication of their queue position (e.g., 8th in line) and alerts the mobile station when a channel is available. In addition, the PACA system and protocol of the present invention allows the subscriber to roam to another cell with a pending PACA request. If the new cell in which the subscriber is located has an available channel, the call request will be serviced immediately. If the subscriber roams to a cell in the current serving system in which resources are not presently available, the PACA request is transferred in a manner that preserves the subscriber's place in the queue. Finally, the PACA system and protocol of the present invention cancels PACA requests under certain conditions. The protocol for each of these above-described features will be described in greater detail herein.

The PACA system and protocol utilizes a number of priority levels. In an exemplary embodiment, 16 priority levels are supported by the present system. The system further supports permanent priority assignments, which are obtained by the subscriber when initially subscribing to cellular service. A subscriber may receive a default PACA priority level and a maximum PACA priority level. Such permanent PACA priority levels are always available and automatically requested at call origination. The mobile station automatically requests the default PACA priority level and permits the user to alter the requested priority level up to the preassigned maximum PACA priority level.

The system also supports "demand" PACA requests, which may be manually requested by the user by prepending a predetermined PACA feature code to the call Origination request. With the demand PACA request, the user also has a preassigned default PACA priority level and a preassigned maximum PACA priority level. The predetermined PACA feature code will initially request the preassigned default PACA priority level, but may be altered to change the PACA priority level request up to the preassigned maximum PACA priority level.

Figure 2:
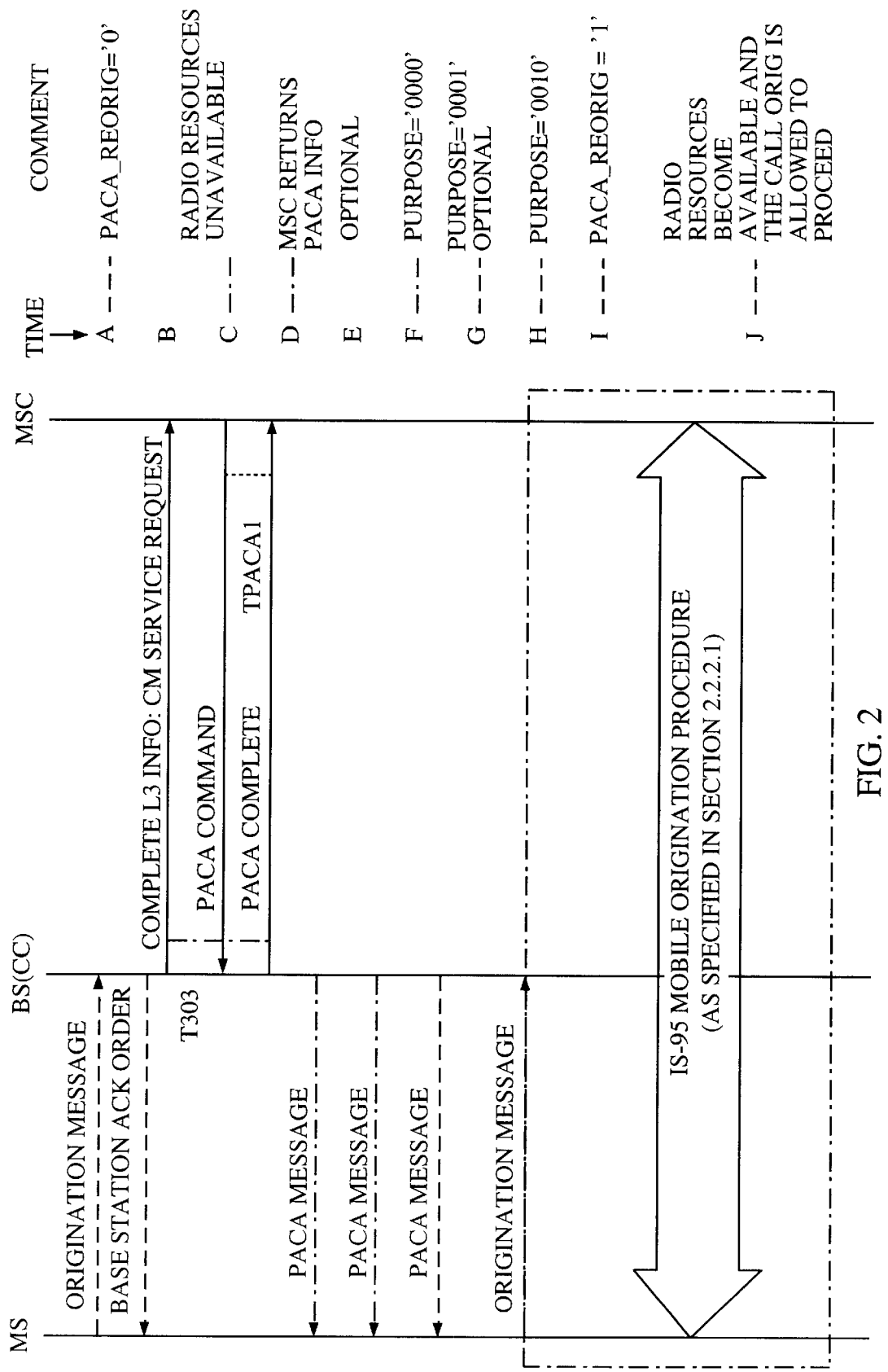
FIG. 2 is a call flow diagram illustrating a communication protocol used by the present invention to successfully establish a communication link having a priority access channel assignment.

FIG. 2 illustrates a call flow diagram for call origination from a mobile station in which a PACA priority level is assigned and the call is successfully completed when a channel becomes available. As can be appreciated by those skilled in the art, a number of communication messages may be transmitted between the mobile station (MS) and the base station (BS) as well as communication messages between the base station and the mobile switching center (MSC). These communications are transparent to the user, but are required by the PACA protocol of the present invention to properly establish a PACA request and to enter the call into the appropriate position in queue. The protocol specifies a series of messages that occur in a time sequence illustrated in FIGS. 2 and 4–9 by a series of lowercase letters. Each action occurring at a particular time may also be thought of as a step in the message processing.

At time a, the mobile station MS initiates a call request by transmitting an Origination Message. The Origination Message is transmitted over the access channel of the air interface to the base station to request priority service. The Origination Message includes a one bit data field, designated as PACA_REORIG. The PACA_REORIG data field is initially set to a value of "0" to indicate a user directed call origination. As discussed above, the user is assigned a default priority level, but may send a feature code with the origination request to demand a different priority level up to the maximum priority level assigned to the user when signing up for service with the service provider.

Under existing communication protocol, an Origination Message requires a "layer 2" acknowledgment. At time b in FIG. 2, the base station BS acknowledges receipt of the Origination Message by transmitting a Base Station Acknowledgment Order to the mobile station MS. This message simply acknowledges receipt of the Origination Message.

At time c, the base station BS constructs a configuration management (CM) Service Request message for transmission to the mobile switching center MSC. The CM Service Request message is a portion of a message defined by current industry standards as a "complete layer 3" information message, which is transmitted from the base station BS to the mobile switching center MSC. Various elements of the CM Service Request message are defined by industry standard IS-634-A, Section 6.1.2.2. An example of the data structure used for the CM Service Request message is shown below in Table 1.

TABLE 1

CM Service Request

| Information Element | Reference | Direction | Type |
|---|---|---|---|
| Protocol Discriminator | Section 6.2.2.39 | BS->MSC | M |
| Reserved-Octet | Section 6.2.2.40 | BS->MSC | M |
| Message Type | Section 6.2.2.4 | BS->MSC | M |
| CM Service Type | Section 6.2.2.51 | BS->MSC | M |
| Classmark Information Type 2 | Section 6.2.2.15 | BS->MSC | M |
| Mobile Identity | Section 6.2.2.16 | BS->MSC | M |
| Called Party BCD Number | Section 6.2.2.52 | BS->MSC | O |
| Mobile Identity (ESN) | Section 6.2.2.16 | BS->MSC | O |
| Signaling Type | Section 6.2.2.145 | BS->MSC | O |
| Slot Cycle Index | Section 6.2.2.17 | BS->MSC | O |
| Authentication Response Parameter (AUTHR) | Section 6.2.2.46 | BS->MSC | O |
| Authentication Confirmation Parameter (RANDC) | Section 6.2.2.42 | BS->MSC | O |
| Authentication Parameter COUNT | Section 6.2.2.47 | BS->MSC | O |
| Authentication Challenge Parameter (RAND) | Section 6.2.2.45 | BS->MSC | O |
| Service Option | Section 6.2.2.66 | BS->MSC | O |
| Voice Privacy Request | Section 6.2.2.13 | BS->MSC | O |
| Radio Environment and Resources | Section 6.2.2.82 | BS->MSC | O |
| Call Configuration | Section 6.2.2.130 | BS->MSC | O |
| Called Party ASCII Number | Section 6.2.2.105 | BS->MSC | O |
| Circuit Identity Code | Section 6.2.2.22 | BS->MSC | O |
| Origination Continuation Indicator | Section 6.2.2.74 | BS->MSC | O |
| Authentication Event | Section 6.2.2.114 | BS->MSC | O[a] |
| Return Cause | Section 6.2.2.100 | BS->MSC | O |
| Service Negotiation Indicator | Section 6.2.2.93 | BS->MSC | O |
| Authentication Data | Section 6.2.2.137 | BS->MSC | O |
| PACA Reorigination Indicator | Section 6.2.2.xy3 | BS->MSC | O[b] |

[a]Present when an authentication enabled base station BS does not receive the authentication parameters (AUTHR, RANDC and COUNT) from the mobile station MS.
[b]Present when the mobile station MS makes a priority service request.

It should be noted that the tables presented herein describe the direction of flow for each of the data elements as well as an indication that each information elements is mandatory (AA) or optional (O). The tables also refer to relevant sections of standards that provide additional details regarding each information element.

The CM Service Request message includes a PACA re-origination indicator element, which is not defined by existing standards. The reference section in Table 1 for the PACA Reorigination Indicator refers to a proposed standard based on the present invention. The PACA re-origination indicator field is set to the same value as the one bit data field PACA$_{13}$ REORIG received in the Origination Message from the mobile station MS. At the time the CM Service Request message is transmitted, the base station BS starts a timer, designated as T303. The timer T303 is an optional time out timer. If appropriate responses are not received from the mobile switching center MSC within a prescribed time period, the base station BS may retransmit the CM Service Request message.

The CM Service Request message includes call origination data (e.g., the electronic serial number (ESN) and/or mobile identification number (MIN) of the mobile station as well as the dialed digits. During analysis of the dialed digits, the mobile switching center MSC detects a PACA call request. In response to this detection, the mobile switching center MSC sends the PACA request, call origination data and dialed digits to the network for authorization. If the authorization is successful, the call origination is allowed to proceed. If the authorization is unsuccessful, the PACA request is denied and the call is terminated.

In a conventional cellular telephone system, the base station BS determines whether resources are currently available to provide a channel assignment to the mobile station. The availability (or lack of availability) of resources is transmitted from the base station BS to the mobile switching center MSC as part of the CM Service Request message. If resources are currently available to provide a channel assignment to the mobile station, the call is processed in a conventional manner. However, if resources are presently unavailable to process the call, the mobile switching center MSC sends a PACA Command message to the base station BS at time d to inform the base station that PACA was successfully activated for the call. The PACA Command message specifies PACA information, including the priority level assigned to the user, and the PACA permanent activation status. As previously discussed, the subscriber may obtain a permanent priority assignment when initially subscribing to the wireless service. The subscriber may receive a default PACA priority level and a maximum PACA priority level. If the subscriber has selected permanent PACA activation, data related to the default PACA priority level and the maximum PACA priority level are stored within the mobile station in a home location register (HLR). A sample data structure used for the PACA command is shown below in Table 2.

TABLE 2

PACA Command

| Information Element | Reference | Direction | Type |
| --- | --- | --- | --- |
| Message Type | Section 6.2.2.4 | MSC->BS | M |
| PACA Information | Section 6.2.2.xy1 | MSC->BS | M |
| PACA Time Delta | Section 6.2.2.xy2 | MSC->BSBS->MSC | O |
| PACA Queue Position | Section 6.2.2.xy3 | MSC->BSBS->MSC | O |
| Mobile Identity (IMSI/MIN) | Section 6.2.2.16 | MSC->BS | O[a] |
| Tag | Section 6.2.2.62 | MSC->BS | O |
| Cell Identifier List | Section 6.2.2.21 | MSC->BS | O |

TABLE 2-continued

PACA Command

| Information Element | Reference | Direction | Type |
| --- | --- | --- | --- |
| Signaling Type | Section 6.2.2.14 | MSC->BS | O |
| Mobile Addressing | Section 6.2.2.84 | MSC->BS | O |

[a]This element is included if the first occurrence of Mobile Identity in this message contains a TMSI.

In addition, the mobile switching center MSC may initiate an optional timer, designated as Tpaca1, at the time the PACA command message is sent to the base station BS. The timer Tpaca1 measures a time out period and is stopped when an optional acknowledgment is received from the base station BS. If the timer Tpaca1 times out prior to receiving a response from the base station BS, the mobile switching center MSC may retransmit the PACA Command message. If the optional acknowledgment message from the base station BS is omitted, the timer Tpaca1 is unnecessary.

A portion of the PACA Command message includes PACA information, such as the PACA priority level assigned to the mobile station and the PACA permanent activation status, a PACA time delta, which indicates the present time minus the time at which the origination request entered the PACA queue at the base station (in 100 millisecond units), and a PACA queue position, which indicates the position of the mobile station MS within the PACA queue. Each of these information data fields is contained within the PACA Command illustrated, by way of example, in Table 2. Tables 3–5 below provide further details of these information data fields. The PACA information data field, illustrated in Table 3, includes a plurality of eight bit data bytes, including an element identifier data field, a length data field indicating the number of bytes to follow, and a PACA indicator value, which is used to provide the PACA indicator value field in accordance with industry standard IS-41-C.

TABLE 3

PACA Information

| 7 | 6 | 5 | 4 | 3 | 2 | 1 | 0 | octet |
| --- | --- | --- | --- | --- | --- | --- | --- | --- |
| | | | Element Identifier | | | | | 1 |
| | | | Length | | | | | 2 |
| | | | PACA Indicator Value | | | | | 3 |

The PACA time delta indicates the elapsed time since the base station BS first received the origination message. The PACA time delta information element includes a one byte element identifier, a one byte length element indicating the number of bytes to follow, and a PACA time delta value in 100 millisecond increments. Alternatively, it is possible to use a time of day standard, such as Greenwich Mean Time, to record the time of day at which PACA requests arrive.

TABLE 4

PACA Time Delta

| 7 | 6 | 5 | 4 | 3 | 2 | 1 | 0 | octet |
| --- | --- | --- | --- | --- | --- | --- | --- | --- |
| | | | Element Identifier | | | | | 1 |
| | | | Length | | | | | 2 |
| | | PACA Time Delta Value in 100 ms Increments | | | | | | |

The PACA queue position is illustrated below in Table 5. The PACA queue position information element includes a one byte element identifier data field, a one byte length data field indicating the number of bytes to follow, and the PACA queue position, which is encoded in accordance with industry standard IS-95-B.

TABLE 5

PACA Queue Position

| 7 | 6 | 5 | 4 | 3 | 2 | 1 | 0 | octet |
|---|---|---|---|---|---|---|---|---|
| | | | Element Identifier | | | | | 1 |
| | | | Length | | | | | 2 |
| | | | PACA Queue Position | | | | | 3 |

At time e, the base station BS sends an optional PACA Complete message to the mobile switching center MSC in response to the PACA Command message. The PACA Complete message provides confirmation that the PACA data was received. However, communication links between the base station BS and the mobile switching center MSC are generally highly reliable. Therefore, the PACA Complete message is optional and may be eliminated. If the optional PACA Complete message is not used, it is unnecessary to implement the timers T303 and Tpaca1. Upon receipt of the PACA Complete message, the mobile switching center MSC stops the timer Tpaca1. The information elements of the PACA Complete message are illustrated below in Table 6.

TABLE 6

PACA Complete

| Information Element | Reference | Direction | Type |
|---|---|---|---|
| Message Type | Section 6.2.2.4 | BS->MSC | M |
| Mobile Identity | Section 6.2.2.16 | BS->MSC | M |
| Tag | Section 6.2.2.62 | BS->MSC | O |
| PACA Time Delta | Section 6.2.2.xy2 | BS->MSC | O |
| PACA Queue Position | Section 6.2.2.xy3 | BS->MSC | O |

Based information received in the PACA Command message, the base station BS will queue the call request and send an air interface PACA Message to the mobile station MS. The PACA Message is predefined by existing standards, and includes a PURPOSE data field to provide status and/or data to the mobile station MS. The standard IS-95-B provides a four bit binary data field to define different PACA message purposes, as illustrated in Table 7 below.

TABLE 7

Is-95-B PACA Message Purpose

PURPOSE
(Binary)  Meaning

0000  Indicates that the purpose of the message is to respond to an Origination Message.
0001  Indicates that the purpose of the message is to provide the queue position of the PACA call.
0010  Indicates that the purpose of the message is to instruct the mobile station to re-originate the PACA call.
0011  Indicates that the purpose of the message is to cancel the PACA call.

At time f in FIG. 2, the base station BS sets the PURPOSE data field in the PACA message to a value of "0000" to inform the mobile station that the priority request has been queued as a PACA call and to indicate the queue position. For example, the user may be third in line for a channel assignment. The PACA message indicates the queue position to the mobile station MS so that the user may determine whether to wait or terminate the call.

The PACA system and protocol of the present invention also allows an optional PACA message with the PURPOSE data field set to a value of "0001" to be transmitted to the mobile station MS over the paging channel to periodically update the PACA queue position, as shown at time g in FIG. 2. The base station BS may resend this message periodically until a voice/traffic channel becomes available. However, this PACA message is optional.

At time h, a traffic channel becomes available. At this time, the base station BS sends an additional PACA message over the air interface to instruct the mobile station MS to re-originate the PACA call. In this case, the PURPOSE data field is set to a value of "0010" to indicate the PACA call re-origination.

At time i, the mobile station MS sends a new Origination Message to the base station BS to request service. The mobile station MS automatically transmits the new Origination Message without any manual intervention required by the user. As previously discussed, the Origination Message is sent with a layer 2 acknowledgment required. Unlike the Origination Message sent at time a, the mobile station MS sets the one bit data field PACA_REORIG to a value of "1" in the Origination Message sent at time i to indicate that the base station BS directed PACA re-origination rather than a user directed origination.

At time j, the base station BS acknowledges the Origination Message with a Base Station Acknowledgment Order to the mobile station MS. At this point, the mobile station MS and the base station BS follow the normal mobile origination procedure as specified in IS-95-B, section 2.2.2.1. Thus, the PACA system and protocol of the present invention provides messaging between the mobile station MS, the base station BS, and the mobile switching center MSC.

In an exemplary embodiment, the queue itself is maintained within each base station BS. As previously described, the position in the queue is based on the priority assigned to the user and the time at which the Origination Message was transmitted from the mobile station MS to the base station BS. As discussed above, the priority for the particular call is transmitted from the mobile switching center MSC to the base station BS in the PACA command, illustrated in FIG. 2 at time d. Based on the priority and the time of arrival of the Origination Message, the base station BS places the call in a position in the queue.

Figure 3A:
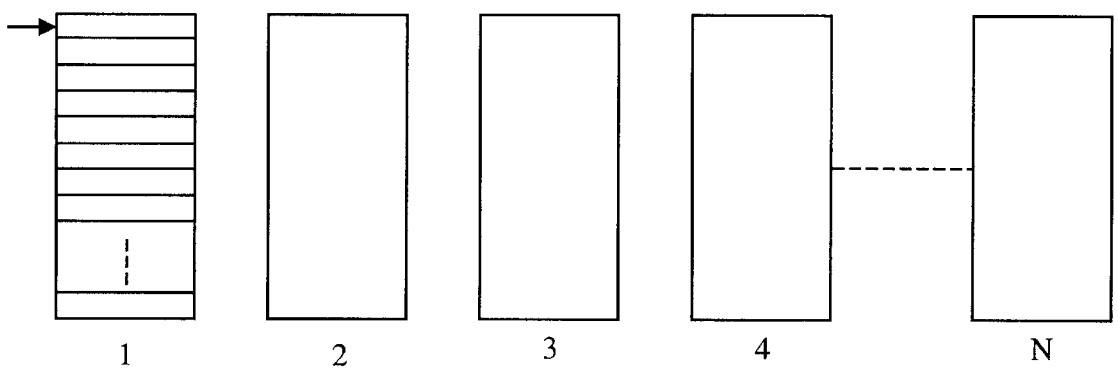
FIGS. 3A–3C illustrate various data structures used to implement a queue for calls awaiting the availability of resources.

The base station BS may utilize a number of known system architectures to implement the queue. A number of known data structures exist to support the operation of the queue. For example, the base station BS may include a separate data structure and maintain separate queues for each priority level. This is illustrated in FIG. 3A where PACA requests may be maintained in sequence for each of n priority levels. The level 1 priority requests are maintained in sequence within a data structure specifically designated for level 1 priority calls. Similarly, data structure 2 maintains a sequential list of level 2 priority calls, and so forth.

Figure 3B:
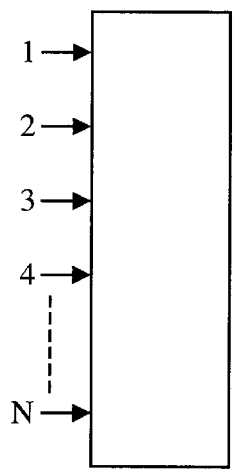

Alternatively, a single data structure may be used to store the data for each call and a pointer or series of pointers used to indicate the head of the queue for each priority level. This is illustrated in FIG. 3B where a single queue contains all pending PACA requests. The PACA requests for each priority level are sequentially stored with a pointer indicating the top of the queue for each priority level.

Figure 3C:
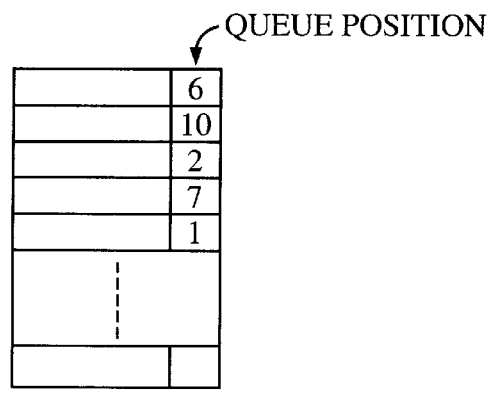

In yet another alternative embodiment, the base station BS may include a single data structure with a data field indicating the position within the queue. This is illustrated in FIG. 3C where PACA requests are stored in a queue in the order in which they are received, regardless of their position in the queue. A data field, indicated in FIG. 3C as a queue position, stores a number indicative of the position of a pending PACA request within the queue. Other known forms of data structures may also be satisfactorily used to implement the queue. It should be clear that the present invention is not limited by the specific form of data structure or system architecture used to implement the queue.

As can be appreciated by those skilled in the art, users are generally unwilling to wait in a queue beyond a certain length of time. Accordingly, maintaining a queue size beyond that which is likely to receive a channel assignment in a few minutes is impractical. A practical implementation of the PACA system and protocol has a maximum queue size. Within the queue, the system attempts to accommodate the highest priority requests. During periods of high call traffic volume the queue may be completely full. Under these conditions, if a call arrives with a higher priority than some calls already in the queue, the system will place the higher priority call in an appropriate position within the queue and drop the lowest priority call from the queue. Dropping a low priority call from the queue results in a PACA Cancel message, which will be described in greater detail below. It should be noted that the system will only terminate lower priority calls at the queuing stage. Once a channel has been assigned and a communication link established, it will not be interrupted to service a higher priority PACA call request.

In summary, the mobile station MS transmits an origination message, which is acknowledged by the base station BS. The base station BS determines whether resources are available to process the call request from the mobile station MS and transmits a CM Service Request message to the mobile switching center MSC. The CM Service Request message includes a data field (see Table 1) that indicates whether or not resources are available. The MSC mobile switching center processes the CM Service Request message. If the $PACA_{13}$ REORIG data field has a value of "0," the mobile switching center MSC knows that the PACA call origination came from the mobile station and is a new call. If the resources are available, the call is processed in the conventional manner. If the resources are not available, the mobile switching center MSC determines whether the subscriber is an authorized user and is authorized to make PACA requests. In addition, the mobile switching center MSC analyzes the dialed digits and determines the priority based on the dialed digits. As previously discussed, certain dialed digits, such as emergency numbers, receive a high priority, while calls to most destination telephone numbers receive the priority level assigned to the subscriber (the default priority level or the requested priority level up to the assigned maximum priority level). The mobile switching center MSC determines the priority and sends the priority data to the base station BS in a PACA Command message, which is acknowledge by a PACA Complete message. The base station BS sends one or more PACA Messages to the mobile station MS. When resources become available, the mobile station MS is instructed to re-originate the call and resources are assigned to the mobile station in a conventional manner. Thus, the PACA system and protocol of the present invention provides a reliable technique for prioritizing incoming calls.

FIG. 2 illustrates the operation of the PACA system and protocol for a successful call completion where the user remains in the queue until resources become available.

Figure 4:
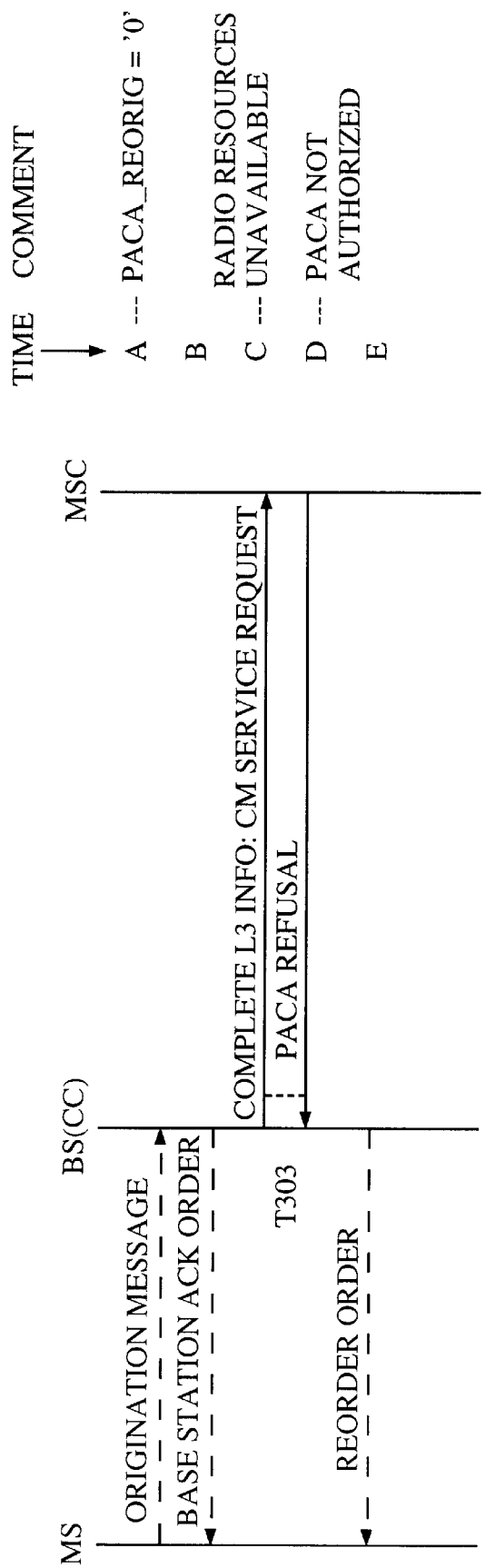
FIG. 4 is a call flow diagram illustrating a communication protocol used by the present invention for an unsuccessful mobile station call origination with priority access channel assignment.

Under some circumstances, the system will not allow a PACA request. For example, when resources are not available, or the PACA priority request is not authorized, the system generates a PACA Refusal message, as illustrated in FIG. 4. In FIG. 4, the steps performed at times a–c are identical to the steps performed at times a–c of FIG. 2. That is, the mobile station MS transmits an Origination Message (time a) with the one bit data field PACA_REORIG set to "0." The base station BS transmits the Base Station Acknowledgment Order message (time b) to the mobile station MS. The base station BS transmits the CM Service Request message (time c), including the PACA re-origination indicator element set to the same value as the one bit data field PACA_REORIG as well as the data field indicating the availability of resources.

The mobile switching center MSC analyzes the PACA request, as described above, and will generate a PACA Refusal message indicating an unsuccessful origination request. The mobile switching center MSC includes appropriate cause values in its message to indicate the reason for a PACA refusal. For example, the PACA request may not be authorized. The information elements of the PACA Failure message are illustrated below in Table 8.

TABLE 8

PACA Refusal

| Information Element | Reference | Direction | Type |
|---|---|---|---|
| Message Type | Section 6.2.2.4 | MSC->BS | M |
| Mobile Identity (TMSI/IMSI/MIN) | Section 6.2.2.16 | MSC->BS | M |
| Cause | Section 6.2.2.19 | MSC->BS | M[a] |
| Mobile Identity (IMSI/MIN) | Section 6.2.2.16 | MSC->BS | O[b] |
| Cell Identifier List | Section 6.2.2.21 | MSC->BS | O |
| Signaling Type | Section 6.2.2.14 | MSC->BS | O |
| Mobile Addressing | Section 6.2.2.84 | MSC->BS | O |

[a]Allowable cause values are: "PACA Not authorized."
[b]This element is included if the first occurrence of Mobile Identity in this message contains a TMSI.

At time d, the mobile switching center MSC transmits the PACA Refusal message to the base station BS. In certain implementations, a signaling connection control part (SCCP) connection may be used per call/activity. If the mobile switching center MSC wishes to refuse the SCCP connection request, it may send the PACA Refusal message via an existing communication protocol, such as the SCCP Connection Refused (SCCP CREF) primitive.

The base station BS receives the PACA Refusal message, either directly or via the SCCP CREF primitive, and, at time e, transmits a Re-Order Order message to the mobile station MS using the air interface. The Re-Order Order message indicates that the call origination has been rejected. In an exemplary embodiment, the Re-Order Order message received by the base station BS includes the reason for the call rejection.

Figure 5:
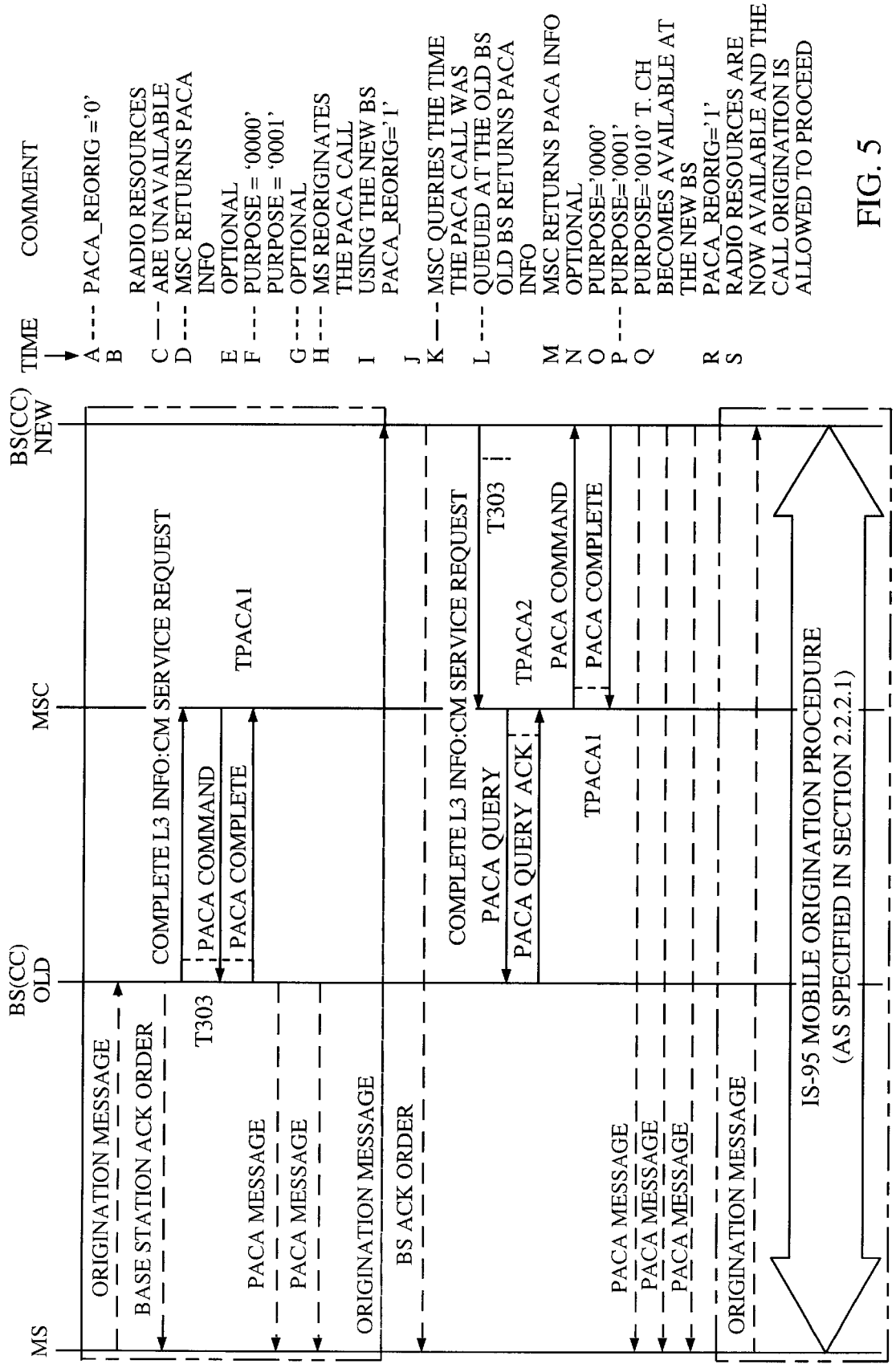
FIG. 5 is a call flow diagram illustrating a communication protocol used by the present invention for a successful mobile station call origination with priority access channel assignment during an idle handoff.

As previously discussed, the mobile station may move from one cell to another while a PACA request is pending in a process known as an idle handoff. FIG. 5 is a call flow diagram indicating messaging when the mobile station switches from one cell to another. If the old base station BS and the new base station BS are both controlled by the same base station controller BSC, the two base stations may communicate directly to handoff the mobile station MS and the PACA call request. FIG. 5 illustrates the call flow diagram when the mobile station moves from a cell controlled by a first base station to a cell controlled by a different base station. For example, the mobile station MS 3 in FIG.

1 moves from the cell C1, which is controlled by first base station controller BSC to the cell C4, which is controlled by a different base station controller. Under these circumstances, the mobile switching center MSC must transfer data from the old base station to the new base station in order to maintain the proper position in the queue.

The steps performed at times a–g in FIG. 5 correspond to the steps performed at times a–g in FIG. 2. That is, the Origination Message (time a), Base Station Acknowledgment Order (time b), CM Service Request message (time c), PACA Command message (time d), the optional PACA Complete message (time e), and one or more PACA Messages (times f and g) are identical to the corresponding messages described above with respect to FIG. 2. As the mobile station MS moves to a new cell, the mobile station automatically transmits a new Origination Message at time h. The new Origination Message re-originates the PACA request to the new base station BS. The one bit data field PACA_REORIG is set to a value of "1" to indicate to the mobile switching center MSC that this is a Re-Origination Request rather than an Original Request. The new base station BS acknowledges the receipt of the Origination Message with the Base Station Acknowledgment Order to the mobile station MS at time i.

At time j, the new base station BS constructs the CM Service Request message and places it in a complete layer 3 information message, transmits the message to the mobile switching center MSC and starts the optional timer T303. The new base station BS includes the PACA re-origination indicator element in the CM Service Request message. The PACA re-origination indicator field is set to the same value as the one bit data field PACA_REORIG field (i.e., PACA_REORIG="1") received in the Origination Message from the mobile station MS. In addition, the mobile switching center MSC receives the call origination and dialed digits in the CM Service Request message, as previously described. By examining the value of the PACA re-origination indicator element, the mobile switching center MSC detects a PACA Re-Origination Request. The mobile switching center MSC recognizes this request as a pending PACA call and need not send a query to the network for authorization. In addition, the mobile switching center MSC receives data (see Table 1) from the new base station BS indicating the availability of resources in the new cell. If resources are available in the new cell, a pending PACA call is immediately connected. However, if resources are not immediately available in the new cell, the new base station BS must obtain information regarding the priority and time of the original PACA request.

At time k, the mobile switching center MSC sends a PACA Query message to the old base station BS to obtain the PACA information, including the PACA queuing time. In addition, the PACA Query message includes a PACA query flag that indicates to the old base station to clear the PACA request once the PACA request information is transmitted to the mobile switching center MSC. This eliminates unnecessary pending PACA requests at the old base station BS. In addition, the mobile switching center MSC starts the timer Tpaca2.

Table 9 below illustrates a structure used for the PACA Query message.

TABLE 9

| PACA Query | | | |
|---|---|---|---|
| Information Element | Reference | Direction | Type |
| Message Type | Section 6.2.2.4 | MSC->BS | M |
| PACA Time Query | Section 6.2.2.xy5 | MSC->BS | M |
| Mobile Identity (IMSI/MIN) | Section 6.2.2.16 | MSC->BS | O |
| Tag | Section 6.2.2.62 | MSC->BS | O |
| Cell Identifier List | Section 6.2.2.21 | MSC->BS | O |
| Signaling Type | Section 6.2.2.14 | MSC->BS | O |
| Mobile Addressing | Section 6.2.2.84 | MSC->BS | O |

The old base station BS returns the requested information to the mobile switching center MSC in a PACA Query Acknowledgment message. In addition, the timer Tpaca2 is stopped. If the time out timer Tpaca2 exceeds a predetermined period (i.e., the PACA Query Acknowledgment message has not been received within the time out period), the mobile switching center MSC may retransmit the PACA Query Request to the old base station BS. Table 10 below illustrates an example of the data structure used for the PACA Query Acknowledgment message.

TABLE 10

| PACA Query Acknowledgment | | | |
|---|---|---|---|
| Information Element | Reference | Direction | Type |
| Message Type | Section 6.2.2.4 | BS->MSC | M |
| Mobile Identity | Section 6.2.2.16 | BS->MSC | M |
| PACA Time Delta | Section 6.2.2.xy4 | BS->MSC | M |
| PACA Queue Position | Section 6.2.2.xy2 | BS->MSC | O |
| Tag | Section 6.2.2.62 | BS->MSC | O |
| Mobile Identity (ESN) | Section 6.2.2.16 | BS->MSC | O |
| Signaling Type | Section 6.2.2.14 | BS->MSC | O |

Following transmission of the requested information to the mobile switching center MSC, the old base station BS removes the pending PACA requests from its queue and may stop any active timer related to the canceled PACA request.

At time m, the mobile switching center MSC sends a PACA Command message to inform the new base station that PACA was successfully activated for the call. The PACA Command message specifies priority level assigned to the user, the PACA queue position, and the PACA queue time information received from the old base station BS. An example of the data structure used for the PACA Command message is provided in Table 2 above.

The new base station BS prioritizes the pending call based on the time of the original call rather than the time of the transfer from the old base station to the new base station. In this manner, the user is assured that their priority will be maintained. It should be noted that the absolute location in the queue may change as a result of switching to a new cell. That is, the location within the queue at the new base station BS will be determined in light of the priority levels of other pending calls in the queue at the new base station. If the user was fifth in line at the old base station (based on priorities and times of arrival of other calls at the old base station), the user may be lower in the queue (e.g., tenth in line) at the new base station because there may be a larger number of higher priority pending PACA requests or a larger number of pending PACA requests of the same priority that arrived earlier in time than the original call at the old base station. Of course, it is also possible that the absolute position in the queue at the new base station will improve if there are fewer higher priority calls at the new base station. Thus, while the absolute location in the queue may change, the user is assured that the relative position in the queue is not adversely effected by changing from one cell to another.

At time n, the new base station BS sends an optional PACA Complete message to the mobile switching center MSC in response to the PACA Command message and halts the optional timer Tpaca1. An example of the data structure used for the PACA Complete message is illustrated in Table 6 above.

Based on the information received in the PACA Command message, the new base station BS queues the pending PACA request and sends an air interface PACA Message to the mobile station MS at time o. As previously described, the new base station sets the PURPOSE data field in the PACA Message to "0000" to inform the mobile station MS that the priority call has been queued as a PACA call and to further indicate the queue position.

At time p, the new base station BS may optionally send one or more additional PACA Messages over the paging channel to update the PACA queue call position. If these optional messages are sent, the new base station BS sets the PURPOSE field in the PACA Message to "0001" to indicate that the queue position has been updated.

When a traffic channel becomes available at time q, the new base station BS sends an additional PACA Message over the air interface to instruct the mobile station MS to re-originate the PACA call. For this PACA Message, the PURPOSE field is set to "0010" to indicate the PACA call re-origination.

At time r, the mobile station MS sends a new Origination Message to the new base station BS to request service. As with other Origination Messages, the Origination Message at time r requires a layer 2 acknowledgment. The mobile station MS sets the one bit data field PACA_REORIG to a value of "1" to indicate PACA re-origination. As previously discussed, the re-Origination Message occurs automatically, without user intervention.

The new base station BS acknowledges the origination Message with a BS Acknowledgment Order Message to the mobile station MS. At this point, the new base station BS and the mobile stations follow the conventional mobile origination procedures described in IS-95-B in section 2.2.2.1.

If the mobile station MS performs an additional idle handoff to another cell, the steps performed at times i–r will be repeated. Thus, the PACA system and protocol of the present invention allow mobility of the user while handing off to new cells. The user is assured that their relative priority will not be affected by switching to a new cell. On some occasions, the user changes from one cell to a different cell supported by a different service provider. Under these circumstances, the PACA system and protocol typically cannot transfer queue data from one base station to another. The pending PACA Request is terminated and the user must re-initiate a call to the new service provider.

Figure 6:
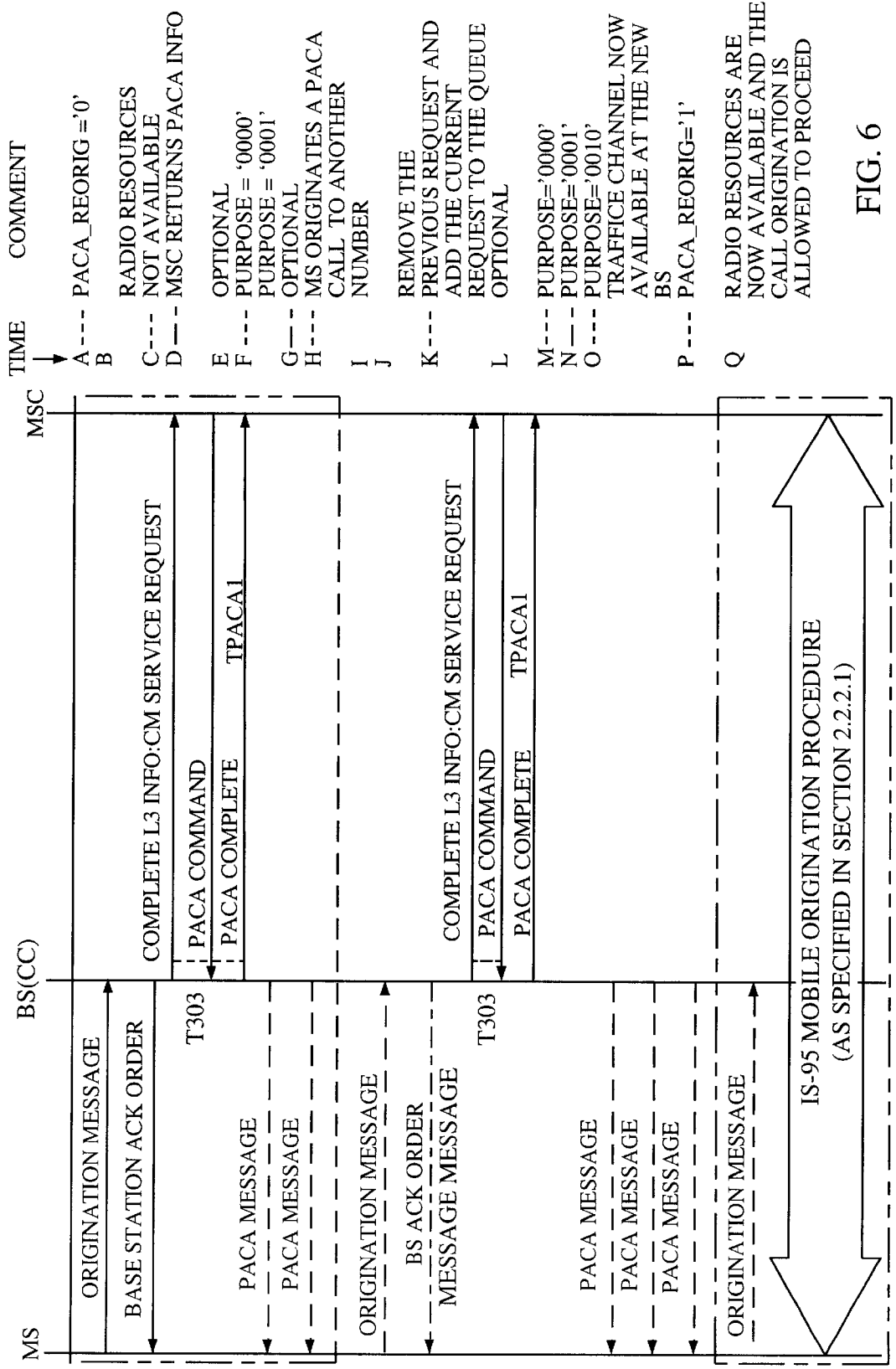
FIG. 6 is a call flow diagram illustrating a communication protocol used by the present invention for a successful mobile station call origination with concurrent priority access channel assignment request.

FIG. 6 is a call flow diagram indicating the processing of concurrent PACA calls. That is, FIG. 6 illustrates the processing if the mobile station initiates a first call, which is placed in a PACA queue, and subsequently initiates a second call, which is also placed in a PACA queue. As illustrated in FIG. 6, the steps performed at times a–g correspond with the steps performed at times a–g illustrated in FIGS. 2 and 5. That is, the PACA system and protocol includes an Origination Message (time a) from the mobile station MS to the base station BS, a Base Station Acknowledgment Order message (time b) from the base station to the mobile station, a CM Service Request message (time c) from the base station to the mobile switching center MSC, a PACA Command message (time d) from the mobile switching center to the base station, the optional PACA Complete message (time e) from the base station to the mobile switching center, and one or more PACA Messages (times f and g) from the base station to the mobile station. After the transmission of the first PACA Message (time f) from the base station BS to the mobile station MS, the mobile station is in a queue and awaiting assignment of a channel when resources become available. If the mobile station MS initiates another call, the PACA system and protocol of the present invention will cancel the pending PACA call and process the subsequent call as a new PACA request.

At time h, the mobile station MS originates a second PACA call to another number while the first PACA call (originated and processed at times a–g) is still pending. As previously described, the Origination Message requires a layer 2 acknowledgment message. At time i, the base station BS transmits the Base Station Acknowledgment Order message to the mobile station MS. The base station BS constructs the CM Service Request message and places it in the complete layer 3 information message for transmission to the mobile switching center MSC. At the same time, the base station BS starts the timer 303. An example of the structure used for the CM Service Request message is provided in Table 1 above. As previously discussed, the CM Service Request message includes the PACA re-origination indicator element, which is set to the same value as the one bit data field FACA_REORIG field received in the Origination Message. Since the current call is also a new call originated by the mobile station MS, the one bit data field PACA_REORIG has a data value of "0." The mobile switching center MSC receives the CM Service Request message, which contains the call origination and dialed digits in addition to the PACA Re-origination Indicator (see Table 1). During analysis of the digits, the mobile switching center MSC detects a PACA call request. The mobile switching center MSC sends the request to the network for authorization. If authorization is successful, the call origination is allowed to proceed.

At time k, the mobile switching center MSC sends the PACA Command message to inform the base station BS that PACA was successfully activated for the new call. An example of the structure used for the PACA Command message is provided in Table 2 above. The PACA Command message specifies the PACA information, including the priority level assigned to the user and the PACA permanent activation. The mobile switching center MSC initiates the optional timer Tpaca1 when the PACA Command message is sent.

The base station BS receives the PACA Command message and processes the command message. Based on the information received in the PACA Command message, the base station BS removes the old PACA request from the queue and places the new request in the queue. After processing the PACA Command message, the base station BS transmits the optional PACA Complete message to the mobile switching center MSC at time 1. Upon receipt of the optional PACA Complete message, the mobile switching center MSC stops the timer Tpaca1. As previously noted, the mobile switching center MSC may retransmit the PACA Command message if the timer Tpaca1 expires prior to the receipt of the PACA Complete message.

In step m, the base station BS sends an air interface PACA Message to the mobile station MS. The base station BS sets the PURPOSE data field in the PACA Message to a binary value of "0000" to inform the user that the new priority call has been queued as a PACA call and to indicate the queue position. This effectively terminates the original call, which was previously pending in the PACA queue in the base station BS. Thus, the user is penalized for placing a second PACA call while the first PACA call was still pending. The user, in effect, has elected to make the second telephone call a higher priority call. Thus, the first pending PACA call is terminated and the second PACA call is assigned a position in the queue based on its priority level and upon the time of receipt of the second call Origination Message (at time h).

At time n, the base station BS may send one or more optional PACA Messages over the paging channel to update the PACA call queue position. The base station BS may send this message periodically until a voice/traffic channel becomes available. The base station BS sets the PURPOSE data field in the PACA Message to a value of "0001" to indicate that the queue position has been updated.

When a traffic channel does become available at time o, the base station BS sends another PACA Message over the air interface to instruct the mobile station MS to re-originate the PACA call. In this case, the PURPOSE field of the PACA Message is set to a binary value of "0010" to indicate PACA call re-origination.

At time p, the mobile station MS sends an Origination Message to the base station BS, with a layer 2 acknowledgment required, to request service. As previously discussed, the mobile station MS sets the one bit data field $PACA_{13}$ REORIG to a value of "1" to indicate PACA re-origination. At time q, the base station BS acknowledges the Origination Message with a Base Station Acknowledgment Order to the mobile station MS. The mobile station MS and base station BS follow the normal mobile call origination procedures specified in IS-95-B, section 2.2.2.1.

Figure 7:
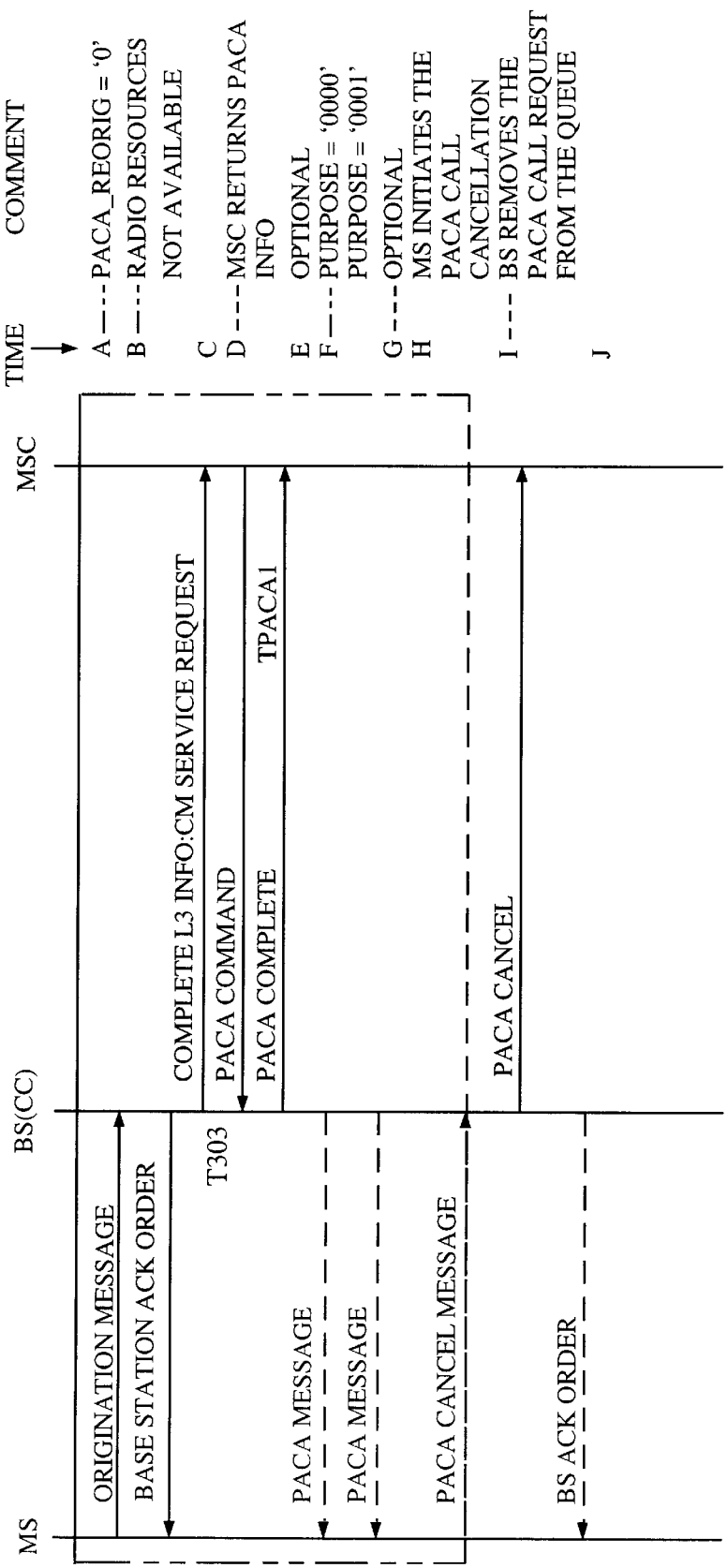
FIG. 7 is a call flow diagram illustrating a communication protocol used by the present invention for the cancellation of a priority access channel assignment request initiated by a mobile station.

FIGS. 2, 5, and 6 all describe messaging in a situation where the PACA call is eventually processed by the cellular telephone system. However, under certain circumstances, a pending PACA request is canceled. The call may be canceled by the mobile subscriber MS, the base station BS, or the mobile switching center MSC. FIG. 7 is a call flow diagram illustrating the processing by the PACA system and protocol to cancel a call where the call cancellation is initiated by the mobile station MS. The steps performed at times a–g in FIG. 7 correspond with the steps performed at times a–g of FIGS. 2, 5, and 6. That is, the protocol includes an Origination Message (time a) from the mobile station MS to the base station BS, a Base Station Acknowledgment Order message (time b) from the base station to the mobile switching center, a CM Service Request message (time c) from the base station to the mobile switching center MSC, a PACA Command message (time d) from the mobile switching center to the base station, the optional PACA Complete message (time e) from the base station to the mobile switching center, a PACA Message (time f) from the base station to the mobile station, and one or more optional PACA Messages (time g) from the base station to the mobile station.

At time h, the mobile station MS transmits a PACA Cancel message over the access channel of the air interface to the base station BS to cancel the pending PACA request. The PACA Cancel message requires a layer 2 acknowledgment.

At time i, the base station BS cancels the pending PACA call and removes the request from the PACA queue. The base station BS then transmits a PACA Cancel message to the mobile switching center MSC to indicate that the PACA call has been canceled. Table 11 below illustrates an example of a structure used to implement the PACA Cancel message.

TABLE 11

PACA Cancel

| Information Element | Reference | Direction | Type |
|---|---|---|---|
| Message Type | Section 6.2.2.4 | BS<->MSC | M |
| Mobile Identity | Section 6.2.2.16 | BS<->MSC | M |
| Cause | Section 6.2.2.19 | BS<->MSC | M[a] |
| Mobile Identity (ESN) | Section 6.2.2.16 | BS->MSC | O[b] |
| Cell Identifier List | Section 6.2.2.21 | BS<-MSC | O[c] |
| Signaling Type | Section 6.2.2.14 | BS<-MSC | O[c] |
| Mobile Addressing | Section 6.2.2.84 | BS<-MSC | O[c] |

[a]Allowable cause values are: "PACA cancellation requested by the MS" in the BS to MSC direction and "PACA cancellation requested by the MSC" in the MSC to BS direction.
[b]This element is included in the message only in the BS to MSC direction and if the air interface PACA Message included the ESN.
[c]This element is included in the message only in the MSC to BS direction.

Figure 9:
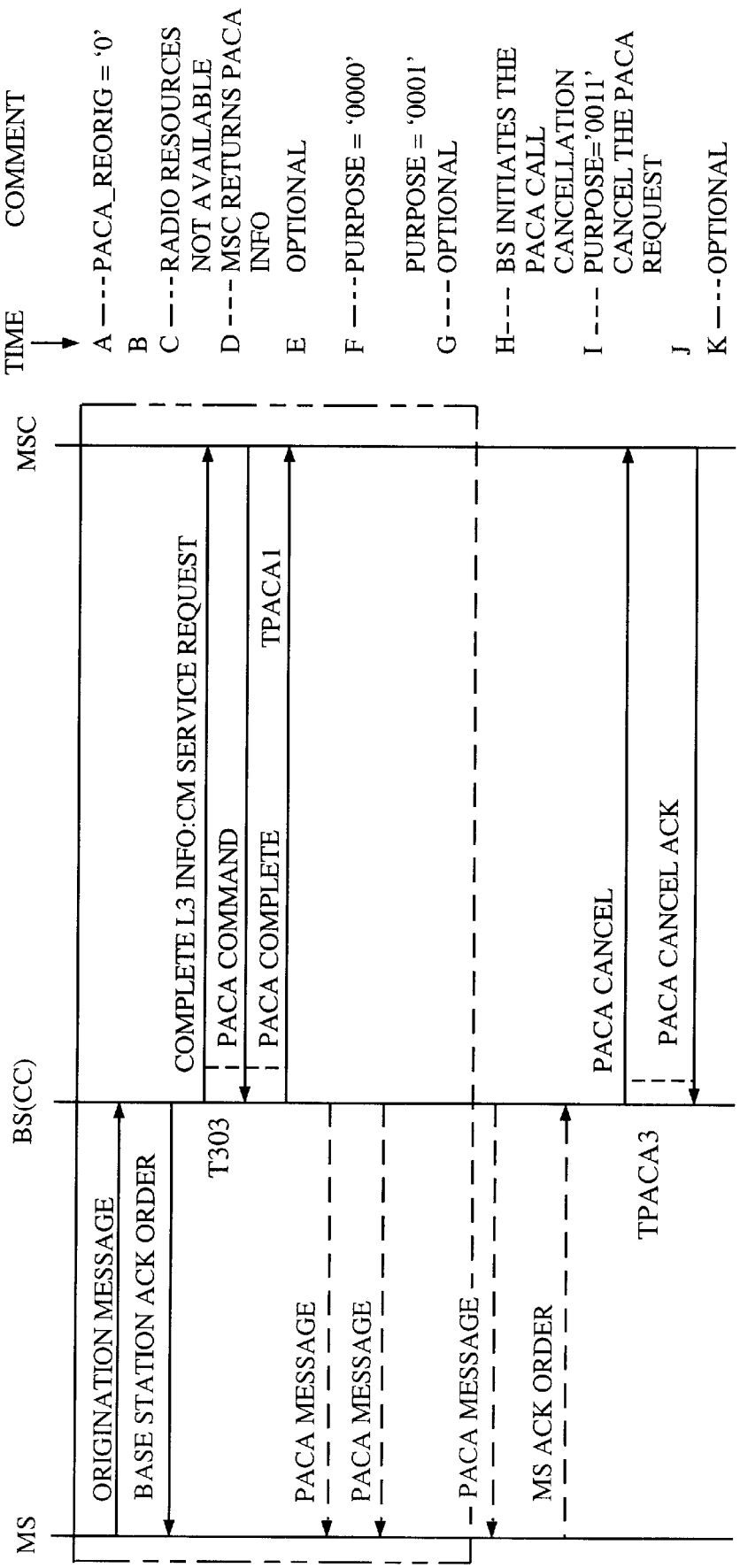
FIG. 9 is a call flow diagram illustrating a communication protocol used by the present invention for the cancellation of a priority access channel assignment request initiated by a base station.

It should be noted that the PACA Cancel message is sent by the base station BS if the mobile station is initiating the PACA cancellation, but may also be transmitted by the mobile switching center MSC to the base station if the mobile switching center is initiating the PACA cancellation (see FIG. 9).

At time j, the base station BS transmits the Base Station Acknowledgment Order to the mobile station MS to confirm the PACA cancellation.

Figure 8:
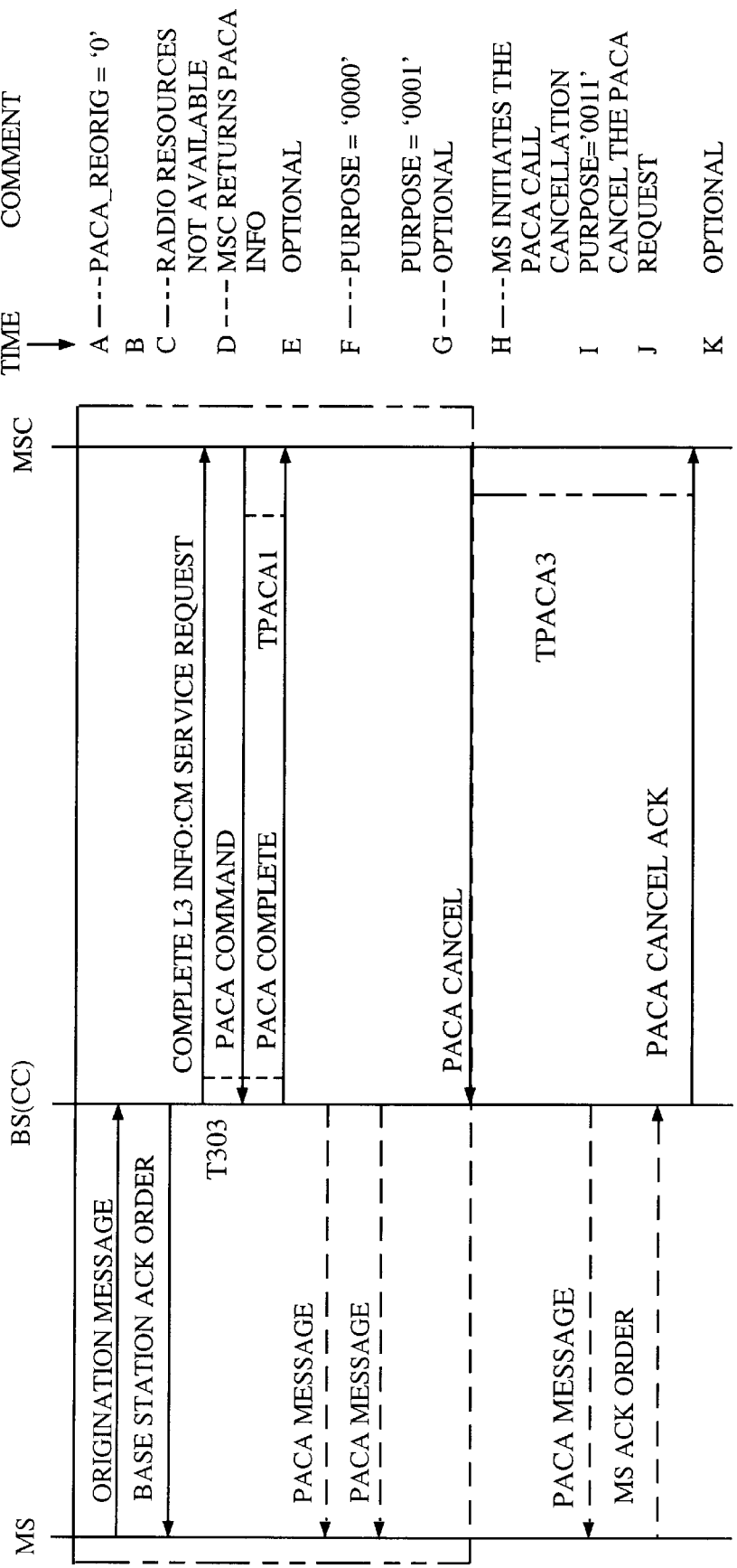
FIG. 8 is a call flow diagram illustrating a communication protocol used by the present invention for the cancellation of a priority access channel assignment request initiated by a mobile switching center.

FIG. 7 illustrates the call flow diagram for PACA call cancellation initiated by the mobile station MS. FIG. 8 is a call flow diagram indicating the messaging performed by the PACA system and protocol of the present invention for call cancellation initiated by the mobile switching center MSC. The steps performed at times a–g of FIG. 8 correspond to the steps performed at times a–g of FIGS. 2 and 5–7. That is, the process includes the Origination Message (time a) from the mobile station MS to the base station BS, a Base Station Acknowledgment Order (time b) from the base station to the mobile station, a CM Service Request (time c) from the base station to the mobile switching center MSC, the PACA Command message (time d) from the mobile switching center to the base station, the optional PACA Complete message (time e) from the base station to the mobile switching center, the PACA message (time f) from the base station to the mobile station, and one or more optional PACA messages (time g) from the base station to the mobile station.

At time h, the mobile switching center initiates a PACA cancellation by transmitting a PACA Cancel message to the base station BS. As previously noted, Table 11 provides an example of a structure used for the PACA Cancel message. In addition, the mobile switching center MSC starts the optional timer Tpaca3, which is a time out timer.

At time i, the base station BS cancels the PACA call and removes the request from the PACA queue. The base station then sends a PACA Message to the mobile station MS to indicate that the PACA call has been canceled. As previously noted in Table 7, the PACA message has a PURPOSE data field. In the present case, the PACA data field is set to a value of "0011" to indicate to the mobile station MS that the PACA call has been canceled.

At time j, the mobile station MS transmits an MS Acknowledgment Order to the base station BS to acknowledge the PACA cancellation. Upon receiving the MS Acknowledgment Order from the mobile station MS, the base station BS may send an optional PACA Cancel Acknowledge message to the mobile switching center MSC to confirm PACA cancellation, shown in FIG. 8 at time k. Table 12 below illustrates an example of a structure used for the PACA Cancel Acknowledge message.

TABLE 12

PACA Cancel Acknowledge

| Information Element | Reference | Direction | Type |
|---|---|---|---|
| Message Type | Section 6.2.2.4 | BS<->MSC | M |
| Mobile Identity | Section 6.2.2.16 | BS<->MSC | M |
| Cell Identifier List | Section 6.2.2.21 | BS<-MSC | O[a] |
| Mobile Identity (ESN) | Section 6.2.2.16 | BS->MSC | O[b] |
| Mobile Addressing | Section 6.2.2.84 | BS<-MSC | O[a] |

[a]This element is included only when the MSC sends this message.
[b]This element is included if the air interface PACA Message included the ESN.

As previously discussed, the communication channel between the base station BS and the mobile switching center MSC is highly reliable. Accordingly, acknowledgment messages transmitted between the base station BS and the mobile switching center MSC are optional. It should be noted that the optional PACA Cancel Acknowledge message is transmitted by the base station BS when the mobile switching center MSC initiates the PACA cancellation (see FIG. 8), and is transmitted from the mobile switching center to the base station when the base station initiates the PACA cancellation (see FIG. 9). Upon receiving the PACA Cancel message from the base station BS, the mobile switching center MSC stops the timer Tpaca3.

The mobile switching center MSC may initiate the PACA call cancellation illustrated in FIG. 8 if the mobile switching center has insufficient resources to process the call. Under other circumstances, the base station BS may have insufficient resources to process the call or may have additional higher priority calls that have been received. Under these circumstances, the base station BS may initiate a call cancellation. FIG. 9 is a call flow diagram indicating the message and processing by the PACA system and protocol of the present invention for call cancellation initiated by the base station BS. The steps performed at times a–g in FIG. 9 are identical to the steps performed at times a–g of FIGS. 2 and 5–8. That is, the process includes the Origination Message (time a) from the mobile station MS to the base station BS, a Base Station Acknowledgment Order (time b) from the base station to the mobile station, a CM Service Request message (time c) from the base station to the mobile switching center MSC, the PACA Command message (time d) from the mobile switching center to the base station, the optional PACA Complete message (time e) from the base station to the mobile switching center, the PACA Message (time f) from the base station to the mobile station, and one or more optional PACA Messages (time g) from the base station to the mobile station.

At this point, the PACA call is in a queue and awaiting the availability of resources. However, under some circumstances, such as when the base station BS receives a large number of higher priority calls, the pending PACA call may be canceled by the base station. Under such circumstances, at time h, the base station BS initiates a PACA request cancellation by sending a PACA Message from the base station to the mobile station MS. As previously discussed, the PACA Message has a PURPOSE data field that is set to a value of "0011" to indicate PACA cancellation.

At time i, the mobile station MS cancels the PACA call and transmits an MS Acknowledgment Order to the base station BS to confirm PACA cancellation. Upon receipt of the MS Acknowledgment Order, the base station BS sends a PACA Cancel message to the mobile switching center MSC, at time j, to indicate that the PACA origination has been canceled. An example of a data structure used for the PACA Cancel message is provided in Table 11 above. The base station BS may optionally start the timer Tpaca3.

Upon receipt of the PACA Cancel message from the base station BS, the mobile switching center MSC may send the optional PACA Cancel Acknowledgment message to the base station in response to the PACA Cancel message. The PACA Cancel Acknowledgment message is transmitted to the base station BS at time k. An example of the data structure used for the PACA Cancel Acknowledgment message is provided in Table 12 above. Upon receipt of the PACA Cancel Acknowledgment message, the base station BS stops the timer Tpaca3.

Thus, the PACA system and protocol of the present invention allows great flexibility in implementing PACA capability in an existing cellular telephone system. The system also advantageously minimizes the amount of messaging, particularly messaging to the mobile switching center MSC. This reduced overhead increases the resources available for call processing.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A priority access channel assignment (PACA) communication protocol for use in a wireless communication system having a plurality of mobile stations, a first base station and a mobile switching center, the protocol comprising:

a first origination message transmitted from a first of the plurality of mobile stations to the first base station for a first call request from the first mobile station, the first origination message including data indicative of a PACA request and a priority access channel assignment origination element indicating that the first call request is initiated by the first mobile station;

a CM service request message transmitted from the first base station to the mobile switching center, the service request message including PACA request data based on the priority access channel assignment origination element transmitted in the first origination message from the first mobile station, wherein said CM request message includes a PACA re-origination indicator element;

a PACA command message from the mobile switching center to the first base station indicating PACA authorization and a priority level associated with the first call request from the first mobile station;

a first PACA message from the first base station to the first mobile station indicating that the first call request from the first mobile station has been granted and placed in a queue associated with the first base station, the first PACA message also indicating the position of first call request within the queue;

detecting an available channel for said first mobile station, and informing said first mobile station of said available channel;

transmitting a re-origination message from said first mobile station to said base station, wherein said re-origination message includes at least one element corresponding to said PACA re-origination indicator element;

assigning said available channel to said first mobile station without a PACA authorization processing.

2. The protocol of claim 1, further comprising:
a second PACA message to the first mobile station at a subsequent time when resources are available to process the first call request, the second PACA message containing data indicating that the first mobile station should reoriginate the first call request; and
a second origination message transmitted from the first mobile station to the first base station, the second origination message including the PACA origination element set to a value indicating the reorigination of the first call request.

3. The protocol of claim 1 wherein a plurality of calls pending in the queue each have a different associated priority level, the first base station processing pending calls in the queue in order of priority with highest priority calls being assigned resources prior to lower priority calls.

4. The protocol of claim 1 wherein a plurality of calls arrive at the first base station at different times and are pending in the queue with an identical associated priority level, the first base station processing pending calls in the queue in order of time of arrival with a call having the earliest time of arrival being assigned resources prior to calls having later times of arrival.

5. The protocol of claim 1, further including a base station acknowledgment message transmitted from the first base station to the mobile station in response to the origination message.

6. The protocol of claim 1, further including a PACA complete message transmitted from the first base station to the mobile switching center to acknowledge receipt of the PACA command message.

7. The protocol of claim 1, further including a third origination message transmitted from the first mobile station to the first base station subsequent to the transmission of the first PACA message and prior to the transmission of the second PACA message, the third origination message including data indicative of a change in the position of the first call request within the queue.

8. The protocol of claim 7 wherein the a third origination message is transmitted from the first mobile station to the first base station a plurality of time subsequent to the transmission of the first PACA message and prior to the transmission of the second PACA message, each of the plurality of third origination messages including data indicative of a change in the position of the first call request within the queue.

9. The protocol of claim 1 wherein the first subscriber has a preassigned default priority level and a preassigned maximum priority level, the origination message being alterable by the user to alter the data indicative of the PACA request to include data indicative of an alternate PACA request having a priority level not exceeding the preassigned maximum priority level.

10. The protocol of claim 1, further including an authorization message to identify the first mobile station, and a PACA refusal message is the first mobile station is not authorized to make priority access channel assignment requests.

11. The protocol of claim 10 wherein the first base station responds to the PACA refusal message by denying the call request and removing the pending call from the queue.

12. The protocol of claim 1 wherein the mobile switching center detects resource availability from the service request message received from the first base station.

13. The protocol of claim 1 for use in a wireless communication system having a plurality of cells communicating with a plurality of base stations and a mobile switching center wherein the first mobile subscriber moves from a first cell controlled by the first base station to a second cell controlled by a second base station and is subsequently communicating with the second base station, the protocol further comprising:
a second origination message transmitted from the first mobile station to the second base station, the second origination message including data indicative of the PACA request and a PACA origination element indicating that the call is a transfer call initiated by the first mobile station;
a service request message transmitted from the second base station to the mobile switching center, the service request message including PACA request data based on the PACA origination element transmitted in the second origination message from the first mobile station;
a PACA query message transmitted from the mobile switching center to the first base station to request priority information from the first base station;
a PACA query acknowledgment message transmitted from the first base station to the mobile switching center in response to the PACA query message, the PACA query acknowledgment message containing the requested priority information;
a PACA command message from the mobile switching center to the second base station indicating PACA authorization and a priority level associated with the first call request from the first mobile station; and
a first PACA message from the second base station to the first mobile station indicating that the call request has been granted and placed in a queue associated with the second base station based on the priority level associated with the first mobile station, the first PACA message also indicating the first mobile station position within the queue.

14. The protocol of claim 13, further comprising:
a second PACA message from the second base station to the first mobile station at a subsequent time when resources are available to process the first call request, the second PACA message containing data indicating that the first mobile station should reoriginate the first call request; and
a second origination message transmitted from the first mobile station to the second base station, the second origination message including the PACA origination element set to a value indicating the reorigination of the first call request.

15. The protocol of claim 13 wherein a plurality of calls pending in the queue associated with the second base station each have a different associated priority level, the second base station processing pending calls in the queue in order of priority with highest priority calls being assigned resources prior to lower priority calls, the first call request from the first mobile station being positioned in the queue associated with the second base station based on the associated priority level.

16. The protocol of claim 13 wherein a plurality of calls arrive at the second base station at different times and are pending in the queue with an identical associated priority level, the first base station processing pending calls in the queue in order of time of arrival with a call having the earliest time of arrival being assigned resources prior to pending calls having later times of arrival, the first call request from the first mobile station being positioned in the queue associated with the second base station based on the time of arrival of the first call request at the first base station.

17. The protocol of claim 1 wherein the first mobile station originates a second call while the first call request is still pending in the queue associated with the first base station, the protocol further comprising:
a second origination message transmitted from the first mobile station to the first base station for a second call request from the first mobile station, the second origination message including data indicative of the PACA request and a priority access channel assignment origination element indicating that the second call request is initiated by the first mobile station;
a service request message transmitted from the second base station to the mobile switching center, the service request message including PACA request data based on the PACA origination element transmitted in the second origination message from the first mobile station;
a PACA command message from the mobile switching center to the first base station indicating priority access channel assignment authorization and a priority level associated with the second call request from the first mobile station; and
a second PACA message from the first base station to the first mobile station indicating that the second call request has been granted and placed in a queue associated with the first base station based on the priority level associated with the second call request from the first mobile station, the first call request from the first mobile station being canceled and removed from the queue, the first PACA message also indicating the position of the second call request from the first mobile station within the queue.

18. The protocol of claim 17, further comprising:
a third PACA message to the first mobile station at a subsequent time when resources are available to process the second call request from the first mobile station, the third PACA message containing data indicating that the first mobile station should reoriginate the second call request; and
a third origination message transmitted from the first mobile station to the first base station, the second origination message including the PACA origination element set to a value indicating the reorigination of the second call request.

19. A method for priority access channel assignment (PACA) communication protocol for use in a wireless communication system having a plurality of mobile stations, a first base station and a mobile switching center, the method comprising:
transmitting a first origination message from a first of the plurality of mobile stations to the first base station for a first call request from the first mobile station, the first origination message including data indicative of a PACA request and a PACA origination element indicating that the first call request is initiated by the first mobile station;
transmitting a service request message from the first base station to the mobile switching center, the service request message including PACA request data based on the PACA origination element transmitted in the first origination message from the first mobile station, wherein said service request message includes a PACA re-origination indicator element;
transmitting a PACA command message from the mobile switching center to the first base station indicating PACA authorization and a priority level associated with the first call request from the first mobile station;
transmitting a first PACA message from the first base station to the first mobile station indicating that the first call request from the first mobile station has been granted and placed in a queue associated with the first base station, the first PACA message also indicating the position of first call request within the queue
detecting an available channel for said first mobile station, and informing said first mobile station of said available channel;
transmitting a re-origination message from said first mobile station to said base station, wherein said re-origination message includes at least one element corresponding to said PACA re-origination indicator element;
assigning said available channel to said first mobile station without a PACA authorization processing.

20. The method of claim 19, further comprising:
transmitting a second PACA message to the first mobile station at a subsequent time when resources are available to process the first call request, the second PACA message containing data indicating that the first mobile station should reoriginate the first call request; and
transmitting a second origination message from the first mobile station to the first base station, the second origination message including the PACA origination element set to a value indicating the reorigination of the first call request.

21. The method of claim 19 wherein a plurality of calls pending in the queue each have a different associated priority level, the first base station processing pending calls in the queue in order of priority with highest priority calls being assigned resources prior to lower priority calls.

22. The method of claim 19 wherein a plurality of calls arrive at the first base station at different times and are pending in the queue with an identical associated priority level, the first base station processing pending calls in the queue in order of time of arrival with a call having the earliest time of arrival being assigned resources prior to calls having later times of arrival.

23. The method of claim 19, further comprising transmitting a base station acknowledgment message from the first base station to the mobile station in response to the origination message.

24. The method of claim 19, further comprising transmitting a PACA complete message from the first base station to the mobile switching center to acknowledge receipt of the PACA command message.

25. The method of claim 19, further comprising transmitting a third origination message from the first mobile station to the first base station subsequent to the transmission of the first PACA message and prior to the transmission of the second PACA message, the third origination message including data indicative of a change in the position of the first call request within the queue.

26. The method of claim 25 wherein the third origination message is transmitted from the first mobile station to the first base station a plurality of time subsequent to the transmission of the first PACA message and prior to the transmission of the second PACA message, each of the plurality of third origination messages including data indicative of a change in the position of the first call request within the queue.

27. The method of claim 19 wherein the first subscriber has a preassigned default priority level and a preassigned maximum priority level, the method further comprising altering the origination message to alter the data indicative of the PACA request to include data indicative of an alternate PACA request having a priority level not exceeding the preassigned maximum priority level.

28. The method of claim 19, further comprising transmitting an authorization message to identify the first mobile station, and a PACA refusal message is the first mobile station is not authorized to make PACA requests.

29. The method of claim 28 wherein the first base station responds to the PACA refusal message by denying the call request and removing the pending call from the queue.

30. The method of claim 19 wherein the mobile switching center detects resource availability from the service request message received from the first base station.

31. The method of claim 19 for use in a wireless communication system having a plurality of cells communicating with a plurality of base stations and a mobile switching center wherein the first mobile subscriber moves from a first cell controlled by the first base station to a second cell controlled by a second base station and is subsequently communicating with the second base station, the method further comprising:

transmitting a second origination message from the first mobile station to the second base station, the second origination message including data indicative of the PACA request and a PACA origination element indicating that the call is a transfer call initiated by the first mobile station;

transmitting a service request message from the second base station to the mobile switching center, the service request message including PACA request data based on the PACA origination element transmitted in the second origination message from the first mobile station;

transmitting a PACA query message from the mobile switching center to the first base station to request priority information from the first base station;

transmitting a PACA query acknowledgment message from the first base station to the mobile switching center in response to the PACA query message, the PACA query acknowledgment message containing the requested priority information;

transmitting a PACA command message from the mobile switching center to the second base station indicating PACA authorization and a priority level associated with the first call request from the first mobile station; and transmitting a first PACA message from the second base station to the first mobile station indicating that the call request has been granted and placed in a queue associated with the second base station based on the priority level associated with the first mobile station, the first PACA message also indicating the first mobile station position within the queue.

32. The method of claim 31, further comprising:

transmitting a second PACA message from the second base station to the first mobile station at a subsequent time when resources are available to process the first call request, the second PACA message containing data indicating that the first mobile station should reoriginate the first call request; and transmitting a second origination message from the first mobile station to the second base station, the second origination message including the PACA origination element set to a value indicating the reorigination of the first call request.

33. The method of claim 32 wherein a plurality of calls pending in the queue associated with the second base station each have a different associated priority level, the second base station processing pending calls in the queue in order of priority with highest priority calls being assigned resources prior to lower priority calls, the first call request from the first mobile station being positioned in the queue associated with the second base station based on the associated priority level.

34. The method of claim 31 wherein a plurality of calls arrive at the second base station at different times and are pending in the queue with an identical associated priority level, the first base station processing pending calls in the queue in order of time of arrival with a call having the earliest time of arrival being assigned resources prior to pending calls having later times of arrival, the first call request from the first mobile station being positioned in the queue associated with the second base station based on the time of arrival of the first call request at the first base station.

35. The method of claim 19 wherein the first mobile station originates a second call while the first call request is still pending in the queue associated with the first base station, the method further comprising:

transmitting a second origination message from the first mobile station to the first base station for a second call request from the first mobile station, the second origination message including data indicative of the PACA request and a PACA origination element indicating that the second call request is initiated by the first mobile station;

transmitting a service request message from the second base station to the mobile switching center, the service request message including PACA request data based on the PACA origination element transmitted in the second origination message from the first mobile station;

transmitting a PACA command message from the mobile switching center to the first base station indicating PACA authorization and a priority level associated with the second call request from the first mobile station; and transmitting a second PACA message from the first base station to the first mobile station indicating that the second call request has been granted and placed in a queue associated with the first base station based on the priority level associated with the second call request from the first mobile station, the first call request from the first mobile station being canceled and removed from the queue, the first PACA message also indicating the position of the second call request from the first mobile station within the queue.

36. The method of claim 35, further comprising:

transmitting a third PACA message to the first mobile station at a subsequent time when resources are available to process the second call request from the first mobile station, the third PACA message containing data indicating that the first mobile station should reoriginate the second call request; and transmitting a third origination message from the first mobile station to the first base station, the second origination message including the PACA origination element set to a value indicating the reorigination of the second call request.

* * * * *